United States Patent
Kim et al.

(10) Patent No.: US 10,264,548 B2
(45) Date of Patent: Apr. 16, 2019

(54) MOBILE EVOLVE PACKET CORE (EPC) AND PAGING METHOD USING THE SAME

(71) Applicant: Foundation of Soongsil University Industry Cooperation, Seoul (KR)

(72) Inventors: Young Han Kim, Seoul (KR); Thanh Hai Ngo, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 202 days.

(21) Appl. No.: 15/045,621

(22) Filed: Feb. 17, 2016

(65) Prior Publication Data
US 2017/0099650 A1    Apr. 6, 2017

(30) Foreign Application Priority Data
Oct. 5, 2015  (KR) .................. 10-2015-0139553

(51) Int. Cl.
*H04W 68/02* (2009.01)
*H04W 4/90* (2018.01)
*H04L 5/00* (2006.01)
*H04W 76/50* (2018.01)
*H04W 8/04* (2009.01)

(52) U.S. Cl.
CPC .......... *H04W 68/02* (2013.01); *H04L 5/0055* (2013.01); *H04W 4/90* (2018.02); *H04W 76/50* (2018.02); *H04W 8/04* (2013.01)

(58) Field of Classification Search
CPC ....... H04W 68/02; H04W 4/22; H04W 24/04; H04W 8/04; H04W 8/005; H04W 36/12; H04L 5/0055
See application file for complete search history.

(56) References Cited

U.S. PATENT DOCUMENTS

| 2015/0173111 A1* | 6/2015 | Agarwal | H04W 8/04 370/329 |
| 2015/0319595 A1* | 11/2015 | Hakola | H04W 8/005 370/254 |
| 2015/0359020 A1* | 12/2015 | Reynaud | H04W 24/04 370/329 |
| 2016/0270027 A1* | 9/2016 | Ang | H04W 68/02 |

FOREIGN PATENT DOCUMENTS

WO    WO-2014188673 A1 * 11/2014 ............ H04W 36/12

* cited by examiner

*Primary Examiner* — Vinncelas Louis
(74) *Attorney, Agent, or Firm* — Mintz Levin Cohn Ferris Glovsky and Popeo, P.C.; Kongsik Kim; Jonathon Western

(57) ABSTRACT

Provided are a mobile evolve packet core (EPC) and a paging method using the same. The mobile EPC includes: a mobile EPC server providing an environment for operating a set of virtual machines (VMs), each of the virtual machines serving as a functional entity of a core network of a mobile communication system; a transmission module transmitting/receiving between the mobile EPC server and components of the mobile communication system or between the mobile EPC server and another mobile EPC server; and a mobile means with the mobile EPC server and the transmission module and providing mobility, wherein the mobile EPC moves to a disaster area to form a public safety network (PSN).

1 Claim, 10 Drawing Sheets

MOBILE EVOLVE PACKET CORE (EPC) AND PAGING METHOD USING THE SAME

CROSS-REFERENCE(S) TO RELATED APPLICATION

This application claims priority of Korean Patent Application No. 10-2015-0139553, filed on Oct. 5, 2015, which is herein incorporated by reference in its entirety.

BACKGROUND OF THE INVENTION

Field of the Invention

The present invention relates to an evolve packet core (EPC), and more particularly, to a mobile EPC and a paging method using the same.

Description of the Related Art

A public safety network (PSN) is a network which is built up in an emergency situation in which a conventional mobile communication infrastructure is unserviceable. In particular, the PSN requires resilience and flexibility of a communication network.

The PSN and a commercial network are strongly recommended have mutual compatibility between both networks in spite of a difference therebetween. Therefore, Third Generation Partnership Project (3GPP) has considered the PSN from Long Term Evolution (LTE) release 12. In particular, U.S. National Public Safety Telecommunications Council (NPSTC) determined a platform for a national wide PSN as LTE in June 2009.

In academic circles, a lot of solutions for the PSN were provided, but no solution has been standardized up to now. Merely, a temporary base station and a femto cell were solutions which were most popular. However, a long distance between a base station and a core network significantly hinders scalability. In addition, in a disaster area, communication between two users needs to particularly pass through the core network even though two users are positioned to be close to each other.

Therefore, in the disaster area, device-to-device communication and an adhoc network may be more efficient in terms of energy consumption and spectrum usage, but it is disadvantageous in that coverage is limited.

Accordingly, a solution to solve the disadvantage in which the coverage is limited while maintaining an advantage of proximity is required.

SUMMARY OF THE INVENTION

The present invention provides a mobile EPC which is a movable type of an evolve packet core (EPC) which is a core network of a mobile communication system.

Further, the present invention provides a mobile EPC and a paging method using the same which built up a public safety network in a disaster area.

According to an aspect of the present invention, disclosed is a mobile evolve packet core (EPC).

According to an embodiment of the present invention, a mobile EPC includes: a mobile EPC server providing an environment for operating a set of virtual machines (VMs), each of the virtual machines serving as a functional entity of a core network of a mobile communication system; a transmission module transmitting/receiving between the mobile EPC server and components of the mobile communication system or between the mobile EPC server and another mobile EPC server; and a mobile means with the mobile EPC server and the transmission module and providing mobility, wherein the mobile EPC moves to a disaster area to form a public safety network (PSN).

The mobile EPC server may include: a mobility management entity (MME) connected with a base station and serving as a control node; a local subscriber server (LSS) storing and managing subscriber information of a user positioned in an area controlled by the mobile EPC; and a system architecture evolution gateway (SAE-GW) created by integrating functions of a serving gateway (S-GW) and a packet data network gateway (P-GW) in a legacy EPC.

The local subscriber server queries a profile of a new user to a home subscriber server (HSS) whenever the new user accesses the mobile EPC to replicate the profile of the new user from the home scriber server.

Information of all users in the disaster area may be stored in a plurality of local subscriber servers distributed in the disaster area.

The system architecture evolution gateway may operate as a mobility anchor transferring data to the system architecture evolution gateway serving a specific mobile terminal (user equipment) with movement of the specific mobile terminal (UE) and serve as a passage in which packets of all users are transmitted when the mobile UE moves between base stations.

The mobile EPC server may perform paging according to a distributed strategy, and in the distributed strategy, only a target mobile EPC server may have positional information of the mobile UE and an original mobile EPC server requests the positional information of the mobile UE to all other mobile EPC servers in order to transfer a packet to the mobile UE, the target mobile EPC server may be a mobile EPC server serving the mobile UE, the original mobile EPC server may be a mobile EPC server to which the mobile UE is initially attached, and when the mobile UE is initially attached to the mobile EPC server, the positional information of the mobile UE is notified to the home subscriber server only once to register the original mobile EPC server in the home subscriber server.

The mobile EPC server may perform paging according to a chain query strategy, and in the chain query strategy, until the mobile UE is found, the original mobile EPC server may request the positional information of the mobile UE to a link of the formed chain, the requested link may request the positional information of the mobile UE to the other link, and the other link may request the positional information of the mobile UE to another link.

In the chain query strategy, the position of the mobile UE may be updated from a new MME/LSS to an old MME/LSS and each MME/LSS knows a next MME/LSS to which the mobile UE moves, and as a result, all MMEs/LSSs registering the mobile UE may form a chain having an original MME/LSS as a start point.

The mobile EPC server may perform paging according to a centralized strategy, and whenever the mobile UE deviates from coverage of the mobile EPC or whenever a target mobility management entity is changed, the position of the mobile UE is updated to an original local subscriber server, and as a result, the original local subscriber server may continuously know a position to which the mobile UE belongs.

According to another aspect of the present invention, disclosed is a paging method performed in a mobile evolve packet core (EPC) moving to a disaster area and forming a public safety network (PSN).

According to another embodiment of the present invention, the paging method includes: transmitting, by an original system architecture evolution gateway (SAE-GW), a downlink data notification message to an original mobility management entity (MME) with receiving downlink data transmitted to mobile UE; transferring the downlink data notification message received by the original MME to all MMEs of the disaster area; transmitting, by a target MME which is a serving MME of the mobile UE, a downlink data notification Ack message to the original MME in order to announce that the mobile UE is controllable to the original MME with receiving the downlink data notification message; transmitting the downlink data notification Ack message received by the original MME to the original SAE-GW; and transmitting, by the target MME, a paging message to a target base station which belongs to a tracking area (TA) in which the mobile UE is registered.

The paging method may use a distributed strategy which is a case in which only the target MME has the positional information of the mobile UE, and in the transferring of the downlink data notification message to all MMEs, the original MME may request the positional information of the mobile UE to MMEs of all other mobile EPC servers.

According to yet another aspect of the present invention, disclosed is a paging method performed in a mobile evolve packet core (EPC) moving to a disaster area and forming a public safety network (PSN).

According to yet another embodiment of the present invention, the paging method includes: transmitting, by an original system architecture evolution gateway (SAE-GW), a downlink data notification message to an original mobility management entity (MME) with receiving downlink data transmitted to mobile UE; transmitting, by all MMEs in which the mobile UE is registered, the downlink data notification message received by the original MME to a chain having the original MME as a start point; transmitting, by a target MME which is a serving MME of the mobile UE, a downlink data notification Ack message to the original MME in order to announce that the mobile UE is controllable to the original MME with receiving the downlink data notification message; transmitting the downlink data notification Ack message received by the original MME to the original SAE-GW; and transmitting, by the target MME, a paging message to a target base station which belongs to a tracking area (TA) in which the mobile UE is registered.

In the paging method, a chain query strategy which is a case in which each MME knows a next MME to which the mobile UE moves may be used and the transmitting of the downlink data notification message to the chain may include transferring the downlink data notification message received by the original MME to a first MME which moves from the original MME; transferring the downlink data notification message received by the first MME to a second MME which moves from the first MME; and transferring the downlink data notification message received by the second MME to a target MME which moves from the second MME.

According to still yet another aspect of the present invention, disclosed is a paging method performed in a mobile evolve packet core (EPC) moving to a disaster area and forming a public safety network (PSN).

According to still yet another embodiment of the present invention, the paging method includes: transmitting, by an original system architecture evolution gateway (SAE-GW), a downlink data notification message to an original mobility management entity (MME) with receiving downlink data transmitted to mobile UE; communicating, by the original MME, with an original LSS thereof in order to determine a target MEE serving target mobile UE and transferring the received downlink data notification message to the determined target MME; transmitting, by a target MME which is a serving MME of the mobile UE, a downlink data notification Ack message to the original MME in order to announce that the mobile UE is controllable to the original MME with receiving the downlink data notification message; transmitting the downlink data notification Ack message received by the original MME to the original SAE-GW; and transmitting, by the target MME, a paging message to a target base station which belongs to a tracking area (TA) in which the mobile UE is registered.

the paging method may use a centralized strategy which is a case in which the original LSS continuously knows a position to which the mobile UE belongs, and whenever the mobile UE deviates from coverage of the mobile EPC or whenever a target mobility management entity is changed, the position of the mobile UE may be updated to an original local subscriber server.

According to exemplary embodiments of the present invention, a mobile EPC can build up a public safety network in a disaster area and completely control a communication session among mobile terminals in the disaster area.

Further, the mobile EPC can still provide access of an external network to the mobile terminal in the disaster area.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
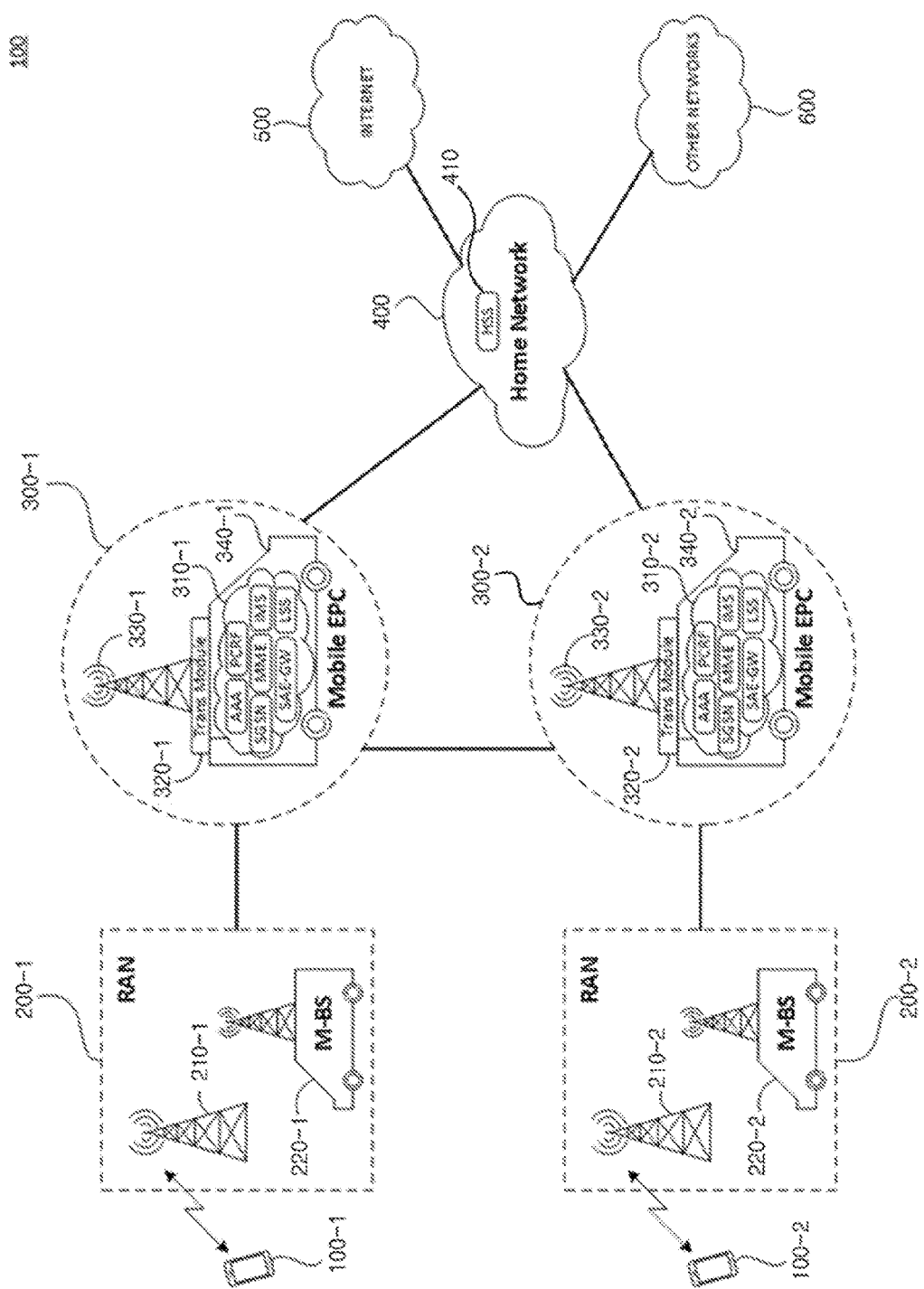
FIG. 1 is a diagram schematically illustrating a configuration of a public safety network system using a mobile evolve packet corer (EPC) according to an exemplary embodiment of the present invention.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

Singular expressions used in the present specification include plural expressions unless they have definitely opposite meanings in the context. In the specification, a term such as "comprising" or "including" should not be interpreted as necessarily including all various components or various steps disclosed in the specification, and it should be interpreted that some component or some steps among them may not be included or additional components or steps may be further included. Further, terms including "unit", "module", and the like disclosed in the specification mean a unit that processes at least one function or operation and this may be implemented by hardware or software or a combination of hardware and software.

Hereinafter, various exemplary embodiments of the present invention will be described in detail with reference to the accompanying drawings.

FIG. 1 is a diagram schematically illustrating a configuration of a public safety network system using a mobile evolve packet corer (EPC) according to an exemplary embodiment of the present invention.

Referring to FIG. 1, a public safety network system in a disaster area includes at least one mobile terminal 100-1 or 100-2, at least one radio access network (hereinafter, referred to as RAN) 200-1 or 200-2, mobile EPCs 300-1 and 300-2, a home network 400, Internet 500, and another network 600.

The mobile terminal 100-1 or 100-2 as a user terminal may be called, for example, a wireless device which is compatible with a legacy mobile communication system, mobile stations (MS), user equipments (UE), or the like. Hereinafter, the mobile terminal 100-1 or 100-2 will be referred to as the UE.

The RAN 200-1 or 200-2 includes a fixed base station 210-1 or 210-2 or a temporary base station 220-1 or 220-2.

The base station 210-1 or 210-2 may be called a base transceiver system (BTS), Node-B, eNodeB, Home eNodeB, Home NodeB, an access Point, a wireless router, or the like. In FIG. 1, the base station 210-1 or 210-2 is illustrated as one component in the RAN 200-1 or 200-2, but the RAN 200-1 or 200-2 may include a lot of base stations and network components which are associated with each other.

For example, the RAN 200-1 or 200-2 may include a base station controller (BSC) or a radio network controller (RNC) that serves as an intermediate node between the base station 210-1 or 210-2 and the core network. Hereinafter, the base station 210-1 or 210-2 will be referred to as the eNodeB and since a general function is already apparent to those skilled in the art, separate description thereof will be omitted.

Further, each RAN 200-1 or 200-2 may be connected with the mobile EPC 300-1 or 300-2 through a microwave, an optical fiber, a satellite, or a wired/wireless link by using other transmission means. In FIG. 1, it is illustrated that the RAN 200-1 or 200-2 and the mobile EPC 300-1 or 300-2 are directly connected with each other, but the RAN 200-1 or 200-2 and the mobile EPC 300-1 or 300-2 may be indirectly connected with each other.

Further, each RAN 200-1 or 200-2 may be wirelessly connected with the mobile terminal 100-1 or 100-2 by using multiple access technologies including CDMA, WCDMA, TDMA, FDMA, SC-FDMA, and OFDMA.

The mobile EPC 300-1 or 300-2 includes one physical mobile EPC server 310-1 or 31-2, a transmission module 320-1 or 320-2, an antenna module 330-1 or 330-2, and moving means 340-1 or 340-2. That is, the mobile EPC 300-1 or 300-2 may include a type in which the mobile EPC server 310-1 or 310-2, the transmission module 320-1 or 320-2, and the antenna module 330-1 or 330-2 are mounted on the moving means 340-1 or 340-2.

For example, the mobile EPC 300-1 and 300-2 may communicate with each other in connection with the home network 400 through at least one transmission link. Herein, the transmission link may be the microwave, the optical fiber, the satellite, or the wired/wireless link using other transmission means.

The mobile EPC servers 310-1 and 310-2 provide an environment for a set of virtual machines (VMs) to operate. Each virtual machine serves as a functional entity of a mobile core network, which includes a mobile management entity (MME), a policy and charging rules function (PCRF), and the like. This will be now described in detail with reference to FIG. 2.

The transmission modules 320-1 and 320-2 serve to transmit signals transmitted/received between the mobile EPC server 310-1 or 310-2 and the RAN 200-1 or 200-2, between the mobile EPC server 310-1 or 310-2 and the home network, and between the mobile EPC servers 310-1 and 310-2. For example, the transmission modules 320-1 and 320-2 may be constituted by a lot of other transmission units including a router, a switch, a transmitter, a receiver, and the like. In addition, the transmission modules 320-1 and 320-2 may be connected with the antenna modules 330-1 and 330-2 when wireless communication is used. The antenna module 330-1 or 330-2 may be mounted on the top of a vehicle which is the moving means 340-1 or 340-2.

The home network 400 is a fixed legacy core part in a mobile communication system. For example, in a situation in which a disaster does not occur, the home network 400 may be a fixed core part of an LTE network used to connect the RAN 200-1 and 200-2 to each other and connect the RANs 200-1 and 200-2 to the Internet 500 and another network 600.

Further, in the situation in which the disaster occurs, the home network 400 may serve as a gateway for connecting the mobile EPCs 300-1 and 300-2 to the Internet 500 and another network 600.

The home network 400 includes a home subscriber server (HSS) (hereinafter, referred to as HSS) 410. The HSS 410 as a huge server center in the home network 400 stores all subscriber information.

The Internet 500 is a global system in which computer networks are connected to each other. For example, the Internet 500 may globally connect billions of devices by using TCP/IP which is a standard Internet protocol.

Another network 600 may be a wired/wireless communication network which is operated by another service provider. For example, another network 600 may include a circuit-switched telephone network providing a telephone service such as a public switched telephone network (PSTN).

Figure 2:
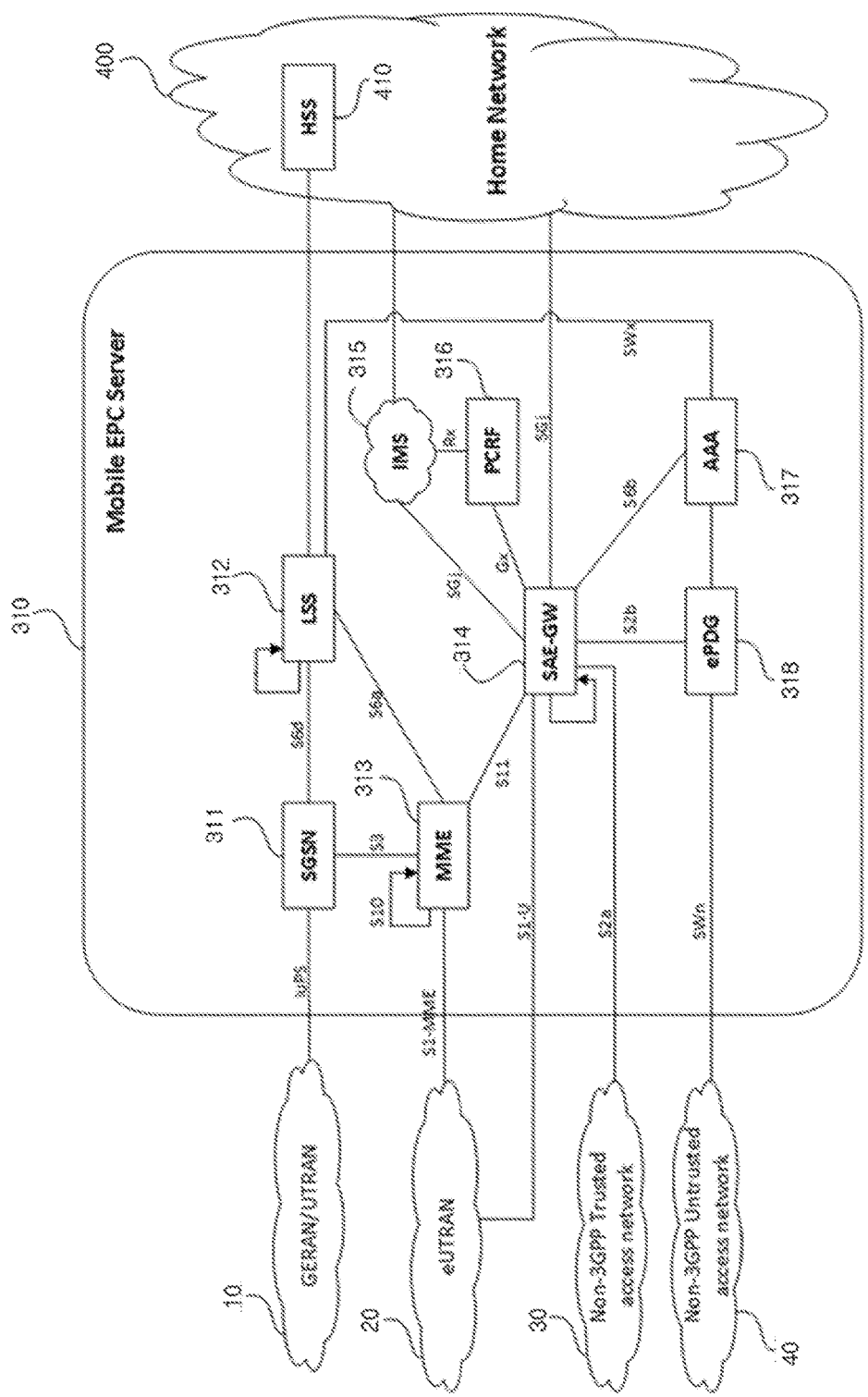
FIG. 2 is a diagram schematically illustrating a primary functional entity that operates as a virtual machine in a mobile EPC server according to the exemplary embodiment of the present invention.

FIG. 2 is a diagram schematically illustrating a primary functional entity that operates as a virtual machine in a mobile EPC server according to the exemplary embodiment of the present invention. According to the exemplary embodiment of the present invention, most entities illustrated in FIG. 2 have the same names as components included in the legacy LTE network and may perform the same functions and roles, but the present invention is not limited thereto.

Referring to FIG. 2, the mobile EPC server 310 may include a packet switching support node (serving GPRS support node (SGSN), hereinafter, referred to as SGSN) 311, a local subscriber server (LSS), hereinafter, referred to as LSS) 312, a mobility management entity (MME), hereinafter, referred to as MME) 313, a system architecture evolution gateway (SAE-GW) (hereinafter, referred to as SAE-GW) 314, an IP multimedia subsystem (IMS) 315, a policy and charging rules function (PCRF) (hereinafter, referred to as PCRF) 316, an authentication, authorization, and accounting server (AAA server) (hereinafter, referred to as AAA server) 317, and an evolved packet data gateway (hereinafter, referred to as ePDG) 318.

The MME 313 may be connected with the eNodeB which is a base component of an eUTRAN 20 through an S1-MME interface and serve as a control node. For example, the MME 313 may perform a control plane function associated with user authentication, bearer management, user tracking, paging, and switching among different RANs.

The PCRF 316 is an entity that supports access to a subscriber database and a special function of a charging system. For example, quality (QoS) control depending on a service level may be achieved through the PCRF 316.

The ePDG 318 is a gateway to a non-3GPP untrusted access network 40. For example, the non-3GPP untrusted access network 40 is a wireless local access network such as WiFi.

Further the ePDG 318 may perform tunnel authentication and authorization and a primary security function associated with IPSec encapsulation/de-capsulation of the packet.

The SGSN 311 is a packet gateway to a GERAN/UTRAN 10. For example, the SGSN 311 may perform authentication, access control, position management, path management, and paging for a user in a packet domain. In addition, the GERAN/UTRAN 10 may be a wireless access network for a GSM/UMTS network depending on definition of 3GPP.

The AAA server 317 is a database entity for non-3GPP access networks. For example, the AAA server 317 may store required information used in the non-3GPP trusted access network 30 or ePDG 318 for the user authentication and verification.

Further, the AAA server 317 communicates with the LSS 312 in order to search a user profile and update contents of the user.

The IMS 315 serves to support an IP based multimedia service. For example, a multimedia application may become a conventional telephone, a fax, an e-mail, a web service, a voice over IP, a video conference, a video on demand (VOD), or a real-time application.

The LSS 312 according to the exemplary embodiment of the present invention is a logic entity which stores and manages subscriber information of the user in an area controlled by the mobile EPC 300.

In particular, the LSS 312 performs a similar role to the HSS 410 of the legacy LTE network, but there is a primary difference in that the LSS 312 does not store information of all users of the network. That is, the HSS 410 still belongs to the home network 400 and the LSS 312 communicates with the HSS 410 through a newly defined interface called S6x. In addition, whenever a new user accesses the mobile EPC 300 in the early stage, the LSS 312 inquires into a profile of a new user to the HSS 410 to copy a copy edition. All user information in the entirety of the disaster area may be stored in a lot of LSSs 312 distributed in the entire disaster area. The LSSs 312 cooperate with each other through a newly defined interface called S6e so that inter-user communication is performed in the disaster area without the HSS 410. The MME 313 and the LSS 312 frequently track the position of the UE 100 and perform communication with the HSS 410 only as necessary. A mechanism associated with the LSS 312 for the UE (100) tracking area update and paging will be described below in more detail with reference to associated drawings.

The SAE-GW 314 according to the exemplary embodiment of the present invention is an entity created by integrating functions of a serving gateway (S-GW) and a packet data network gateway (P-GW) in a legacy EPC. Since the mobile EPC 300 is executed by a distributed access method, separating the S-GW and the P-GW is not required any longer.

IP packets of all users are transmitted through the SAE-GW 314 that operates as a mobility anchor when the UE 100 moves between the base stations. For example, the SAE-GW 314 may perform IP address allocation to the UE 100, QoS execution according to a rule of the PCRF 316 and flow-based charging, bearer management by other 3GPP technology, and mutual interlocking.

The SAE-GWs 314 cooperate with each other through an Ss interface that enables continuity of a session when the UE 100 moves between two adjacent open EPCs.

For example, a protocol stack of Ss may include 5 layers such as an S5 interface including a physical layer, a datalink layer, an IP layer, a UDP layer, and a GTP-C layer.

In addition, the SAE-GW 314 may use a conventional standard interface in order to communicate with the SGSN 311, the LSS 312, the MME 313, the IMS 315, the PCRF 316, the AAA server 317, the ePDG 318, and the like and may be connected to the Internet 500 and another network 600 through the home network 400.

Figure 3:
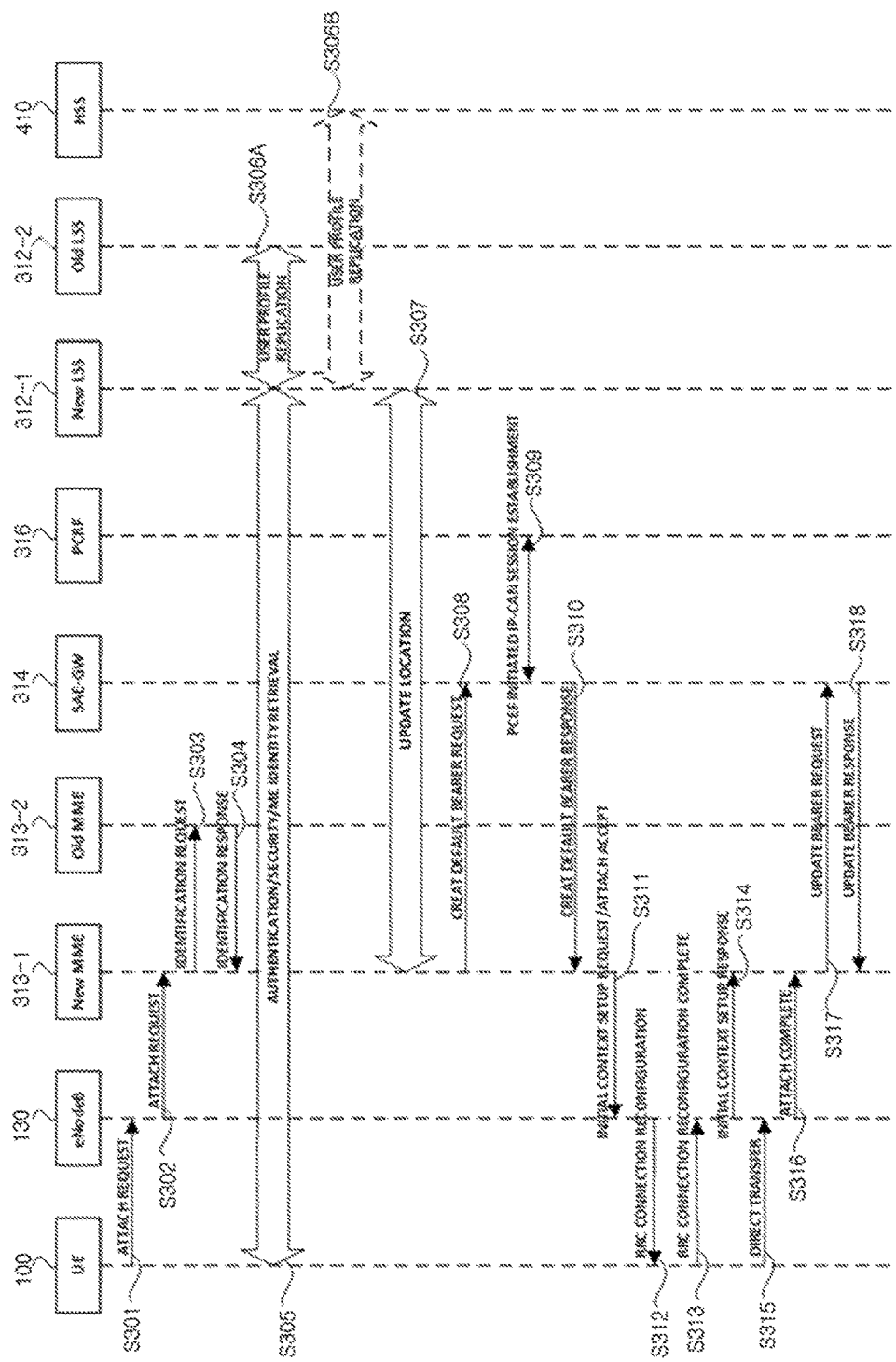
FIG. 3 is a flowchart illustrating a procedure in which UE is attached to a new mobile EPC according to an exemplary embodiment of the present invention.

FIG. 3 is a flowchart illustrating a procedure in which UE is attached to a new mobile EPC according to an exemplary embodiment of the present invention. In FIG. 3, the flowchart is described by assuming that a new MME 313-1 is a current MME to which the UE 100 will be attached, an old MME 313-2 is an MME and an LSS to which the UE 100 was attached previously, and the SAE-GW 314, the PCRF 316, and a new LSS 312-1 are functional entity that belong to the same mobile EPC 300 as the new MME 313-1.

In step S301, the UE 100 transmits an attach request message to the eNodeB 130 as the user turns on power. For example, a format of the attach request message may follow a 3GPP standard.

In step S302, as the eNodeB 130 receives the attach request message from the UE 100, the eNodeB 130 transmits the attach request message to the new MME 313-1. For example, the eNodeB 130 verifies an MME ID included in the attach request message and when the eNodeB 130 is connected with an MME verified with the MME ID, the eNodeB 130 transfers the attach request message to the corresponding MME and when the eNodeB 130 is not connected with the verified MME, the eNodeB 130 selects a new MME to transfer the attach request message to the selected MME. In FIG. 3, the latter is assumed. That is, the MME ID included in the attach request message may become an ID of the old MME 313-2.

In step S303, since the MME is changed, the new MME 313-1 transmits an identification request message to the old MME 313-2 by using the MME ID included in the attach request message in order to acquire a UE context.

In step S304, the old MME 313-2 transmits an identification response message to the new MME 313-1 with receiving the identification request message.

In step S305, authentication and security procedures are performed among the UE 100, the new 313-1, and the new LSS 312-1.

In step S306A, when the new LSS 312-1 is unknown UE 100, the new LSS 312-1 acquires a user profile from the old MME 313-2.

In step S306B, when the new LSS 312-1 is initially attached by the UE 100, the new LSS 312-1 acquires the user profile from the HSS 410. In such a case, the new LSS 312-1 may become an original LSS and in this case, the HSS 410 may store information on the original LSS to which the UE 100 belongs.

In step S307, since the MME and the LSS are changed, the new 313-1 performs a position update procedure of the corresponding UE 100. The position update procedure according to the exemplary embodiment of the present invention follows a cooperation strategy between the MMS and the LSS for tracking the position of the UE 100 and this will be described below in detail with reference to FIGS. 4 and 5.

In step S308, the new MME 313-1 transmits a create default bearer request message to the SAE-GW 314. Herein, as the SAE-GW 314 receives the create default bearer request message, the SAE-GW 314 creates a new entry in an EPS bearer table and creates a charging ID for a default bearer. Further, the SAE-GW 314 allocates an IP address to the UE 100.

In step S309, the PCRF 316 examines the default bearer. In this case, the SAE-GW 314 may acquire a default bearer policy and charging control (PCC) rule for the UE 100.

In step S310, the SAE-GW 314 transmits a create default bearer response message including all bearer information to the new MME 313-1.

In steps S311 to S316, the default bearer is established in the UE 100 through a radio interface.

In step S317, when setup of the default bearer is completed, the new MME 313-1 transmits an eNodeB tunnel endpoint identifier (TEID) to the SAE-GW 314.

In step S318, the SAE-GW 314 transmits an update bearer response message to the new MME 313-1. Herein, the update bearer response message is a message for confirming the default bearer to be used between an uplink and a downlink.

Figure 4:
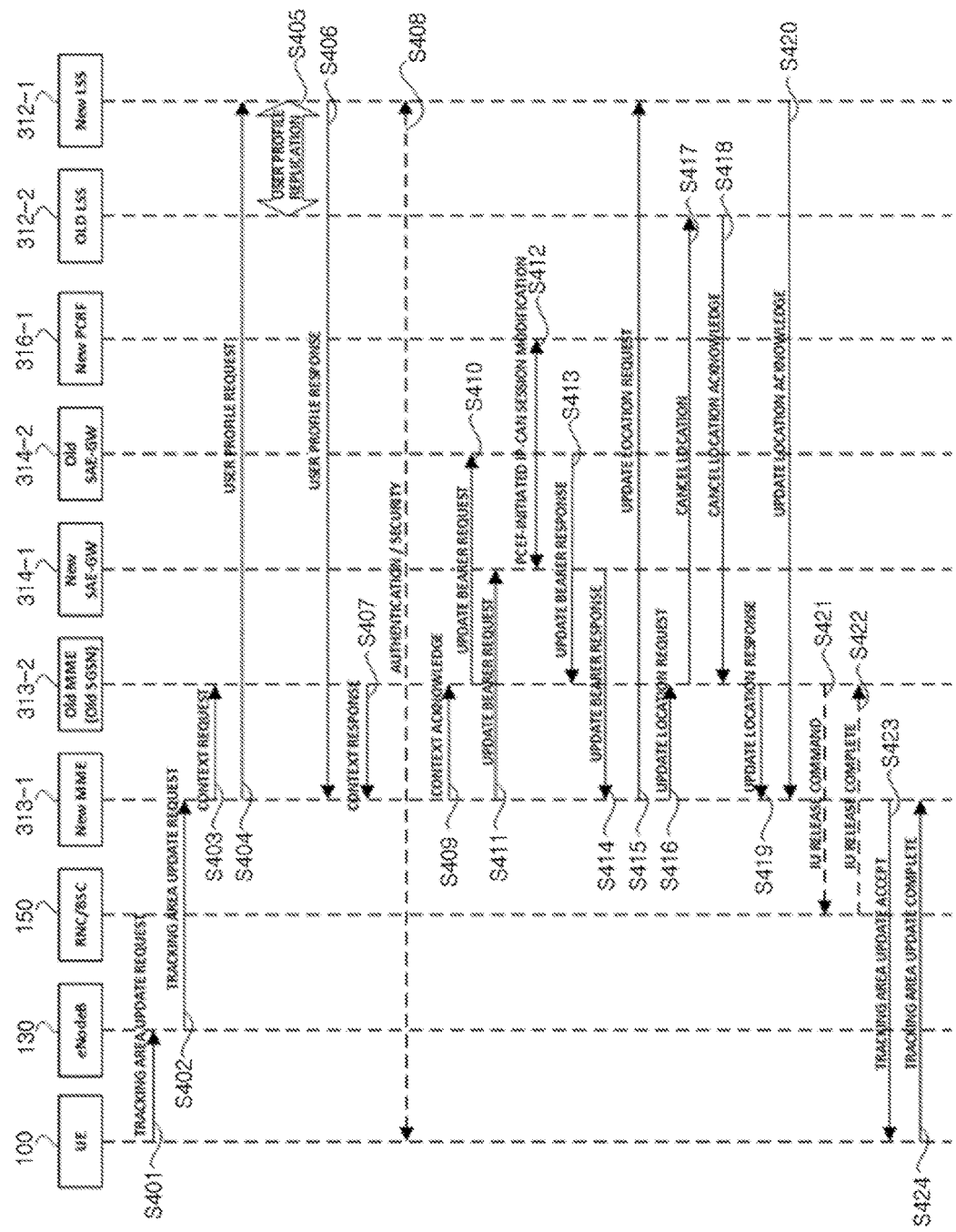
FIG. 4 is a flowchart illustrating a tracking area update procedure depending on change of a mobile EPC according to an exemplary embodiment of the present invention.

FIG. 4 is a flowchart illustrating a tracking area update procedure depending on change of a mobile EPC according to an exemplary embodiment of the present invention. In FIG. 4, the tracking area update procedure using a distributed strategy and a chain query strategy according to the exemplary embodiment of the present invention will be described.

If the MME is not changed, the UE performs tracing area update to a serving MME/LSS by a similar method to a standard procedure.

On the contrary, when the distributed strategy and the chain query strategy according to the exemplary embodiment of the present invention are used, all mobile EPCs other than an original mobile EPC may perform the same role. When the UE moves to another mobile EPC, the position will be updated to the new EPC and the position of the old EPC will be cancelled.

When the UE 100 deviates from an allocated tracking area (TA) or the UE 100 moves from a 2G/3G network to an LTE network, the UE 100 decides performing the tracking area update.

In step S401, as the UE 100 decides performing the tracking area update, the UE 100 transmits a tracking area update request message to the eNodeB 130.

In step S402, the eNodeB 130 transmits the tracking area update request message to the new MME 313-1 according to a request from the UE 100. That is, the eNodeB 130 may sense that the indicated MME is changed and select the new MME 313-1 and transmit the tracking area update request message to the selected new MME 313-1.

In step S403, the new MME 313-1 transmits a context request message to the old MME 313-2 with receiving the tracking area update request message to request a context of the UE 100 to the old MME 313-2.

In step S404, the new MME 313-1 transmits a user profile request message to the new LSS 312-1 simultaneously with step S403 so that a user profile replication procedure between the new LSS 312-1 and the old LSS 312-2 is performed.

In step S405, the new LSS 312-1 and the old LSS 312-2 cooperate with each other so that the user profile is replicated from the old LSS 312-2 to the new LSS 312-1 with transmitting the user profile request message to the new LSS 312-1.

For example, when the chain query strategy is used, the number of mobile EPCs 300 in which the UE 100 is registered previously may be included in the tracking area update request message. IN addition, when the number reaches a maximum value defined by an operator, the new MME/LSS may perform the user profile replication procedure and update information to the HSS 410. This finally means that the new mobile EPC becomes the original mobile EPC.

In step S406, the new LSS 312-1 receives a copy edition of the user profile from the old LSS 312-1 and thereafter, transmits a user profile response message to the new MME 313-1.

In step S407, simultaneously, the old MME 313-2 examines integrity of the tracking area update request message included in the context request message and when the examination is successful, the old MME 313-2 transmits a context response message to the new MME 313-1 to provide UE context to the new MME 313-1.

In step S408, when the examination is unsuccessful, the old MME 313-2 transmits the context response message including error announcement information to the new MME 313-1 and the authentication and security procedures are performed among the UE 100, the new MME 313-1, and the new LSS 312-1.

In step S409, the new MME 313-1 transmits to the old MME 313-2 a context acknowledge message announcing reception of the UE context.

In step S410, the old MME 313-2 transmits an update bearer request message to the old SAE-GW 314-2 in order to remove a bearer context of the UE 100.

In step S411, the new MME 313-1 transmits a bearer request message to the new SAE-GW 314-1 in order to announce change of the MME based on the received UE context. In this case, the new SAE-GW 314-1 updates an RAT type and the position of the UE 100 to a current RAT type and a current position of the UE 100.

In step S412, the new SAE-GW 314-1 announces the change of the RAT type and the position to the PCRF 316-1.

In step S413, the old SAE-GW 314-2 removes the bearer context of the UE 100 and thereafter, transmits the update bearer response message to the old MME 313-2.

In step S414, the new SAE-GW 314-1 updates the RAT type and the position and thereafter, transmits the update bearer response message to the new MME 313-1 in order to confirm the new MME 313-1.

In step S415, the new MME 313-1 transmits an update location request message to the new LSS 312-1 in order to announce that the UE 100 is controlled to the new LSS 312-1. As a result, the new LSS 312-1 stores an address of the new MME 313-1 and maintains an address of the old MME 313-2, which is stored.

In step S416, the new MME 313-1 transmits to the old MME 313-2 the update location request message instructing the old MME 313-2 to cancel the UE context.

In step S417, the old MME 313-2 transmits to the old LSS 312-2 an instruction for removing the information of the UE 100.

In step S418, the old LSS 312-2 transmits to the old MME 313-2 a response message for announcing that the information of the UE 100 is removed.

In step S419, the old MME 313-2 transmits to the new MME 313-1 an update location response message for the update location request message of the new MME 313-1 with receiving the response message from the old LSS 312-2.

In step S420, the new LSS 312-1 transmits to the new LSS 312-1 an update location acknowledge message for the received update location request message.

In step S421, the old MME 313-2 transmits an Iu release command message to an RNC/BSC 150. For example, when the UE 100 moves from the 2G/3G network to the LTE network, the entity 313-2 may become an old SGSN instead of an old MME.

In step S422, the RNC/BSC 150 releases Iu access according to the Iu release command message and transmits an Iu release complete message to the old MME 313-2.

In step S423, the new MME 313-1 transmits a tracking area update accept message to the UE 100 to complete the tracking area update procedure. Herein, the tracking area update accept message may include a new tracking area list and a new globally unique temporary ID (GUTI) for the UE 100.

In step S424, the UE 100 transmits the tracking area update complete message to the new MME 313-1 in order to confirm a new GUTI with receiving the tracking area update accept message.

Figure 5:
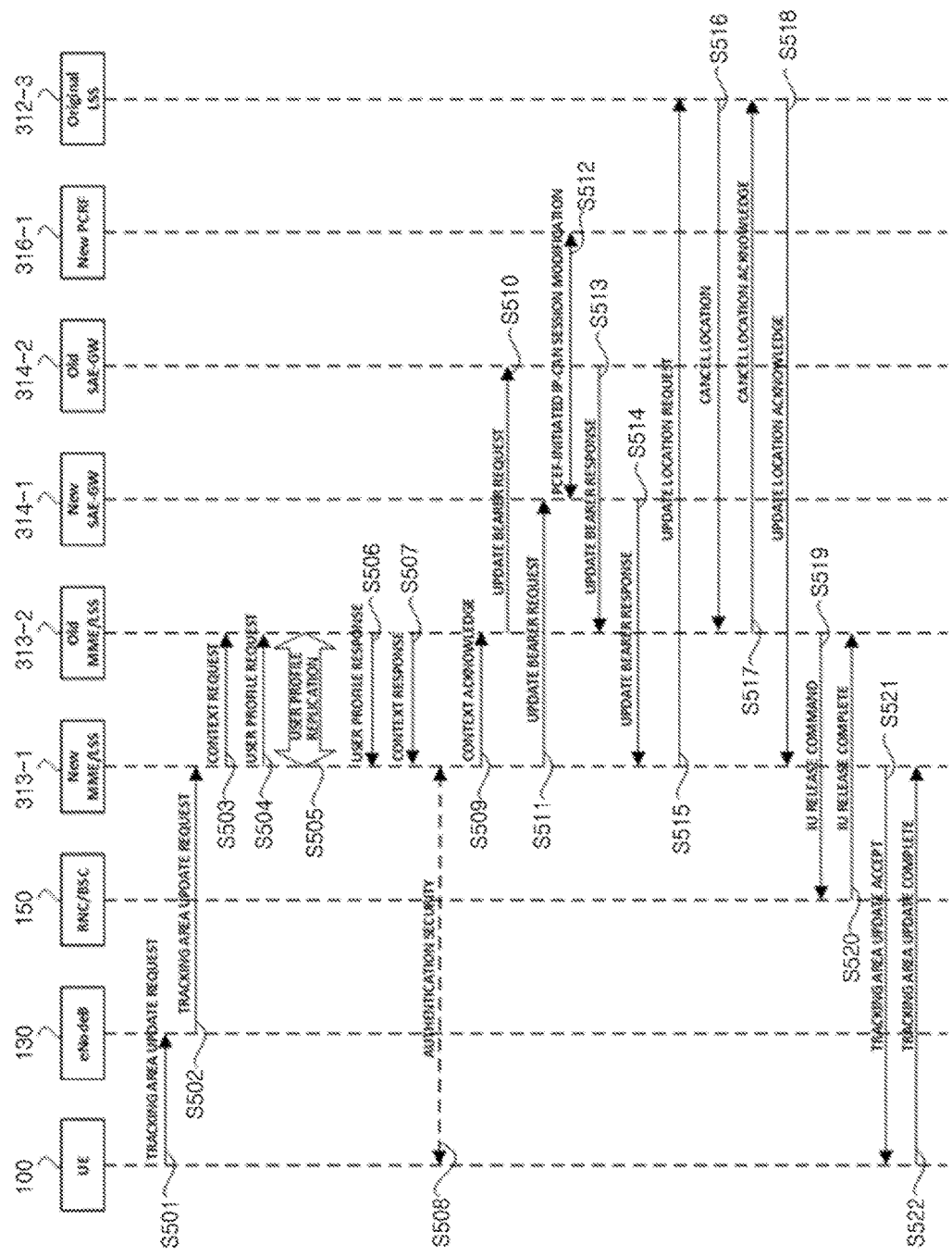
FIG. 5 is a flowchart illustrating tracking area update depending on change of a mobile EPC according to another exemplary embodiment of the present invention.

FIG. 5 is a flowchart illustrating a tracking area update procedure depending on change of a mobile EPC according to another exemplary embodiment of the present invention. In FIG. 4, the tracking area update procedure using a centralized strategy according to the exemplary embodiment of the present invention will be described.

When the centralized strategy according to the exemplary embodiment of the present invention is used, an original LSS tracks the UE even when the UE moves in the disaster area or when the UE moves to another mobile EPC. When the UE moves through multiple mobile EPCs, the position is updated to the new mobile EPC and the original LSS and the position at the old EPC is cancelled.

When the UE 100 deviates from the allocated tracking area (TA) or the UE 100 moves from the 2G/3G network to the LTE network, the UE 100 decides performing the tracking area update.

In step S501, as the UE 100 decides performing the tracking area update, the UE 100 transmits the tracking area update request message to the eNodeB 130.

In step S502, the eNodeB 130 transmits the tracking area update request message to the new MME 313-1 according to the request from the UE 100. That is, the eNodeB 130 may sense that the indicated MME is changed and select the new MME 313-1 and transmit the tracking area update request message to the selected new MME 313-1.

In step S503, the new MME 313-1 transmits the context request message to the old MME 313-2 with receiving the tracking area update request message to request the context of the UE 100 to the old MME 313-2.

In step S504, the new LSS 313-1 transmits the user profile request message to the old LSS 313-2 simultaneously with step S503 so that the user profile replication procedure between the new LSS 313-1 and the old LSS 313-2 is performed.

In step S505, the old LSS 312-2 transmits the user profile to the new LSS 312-1.

In step S506, the old LSS 312-2 transmits the user profile response message to the new LSS 312-1 and the new MME 313-1.

In step S507, simultaneously, the old MME 313-2 examines the integrity of the tracking area update request message included in the context request message and when the examination is successful, the old MME 313-2 transmits the context response message to the new MME 313-1 to provide the UE context to the new MME 313-1.

Since steps S508 to S514 are duplicated with steps S408 to S414 of FIG. 4, steps S508 to S514 will be omitted.

In step S515, the new MME 313-1 transmits the update location request message to the original LSS 312-3 in order to announce that the UE 100 moves to the original LSS 312-3. In this case, the new MME 313-1 may acquire information on the original LSS 312-3 included in the tracking area update request message and the original LSS 312-3 may store the address of the new MME 313-1.

In step S516, the original LSS 312-3 transmits to the old MME 313-2 a cancellation location message instructing the UE context to be cancelled.

In step S517, the old MME 313-2 transmits to the original LSS 312-3 the response message for announcing that the information of the UE 100 is removed. That is, the old MME 313-2 cancels the UE context and the old LSS 313-2 may transmit the old LSS 313-2 to remove the information of the UE 100 and thereafter, transmit the response message to the old LSS 312-3.

In step S518, the original LSS 312-3 transmits to the new MME 313-1 the update location acknowledge message for the received update location request message.

Communication between the original LSS 312-3 and the MMEs may be performed through an S6a interface or by using the original MME as an intermediate node.

In step S519, the old MME 313-2 transmits the Iu release command message to the RNC/BSC 150. For example, when the UE 100 moves from the 2G/3G network to the LTE network, the entity 313-2 may become the old SGSN instead of the old MME.

In step S520, the RNC/BSC 150 releases the Iu access according to the Iu release command message and transmits the Iu release complete message to the old MME 313-2.

In step S521, the new MME 313-1 transmits the tracking area update accept message to the UE 100 to complete the tracking area update procedure. Herein, the tracking area update accept message may include the new tracking area list and the new globally unique temporary ID (GUTI) for the UE 100.

In step S522, the UE 100 transmits the tracking area update complete message to the new MME 313-1 in order to confirm the new GUTI with receiving the tracking area update accept message.

Figure 6:
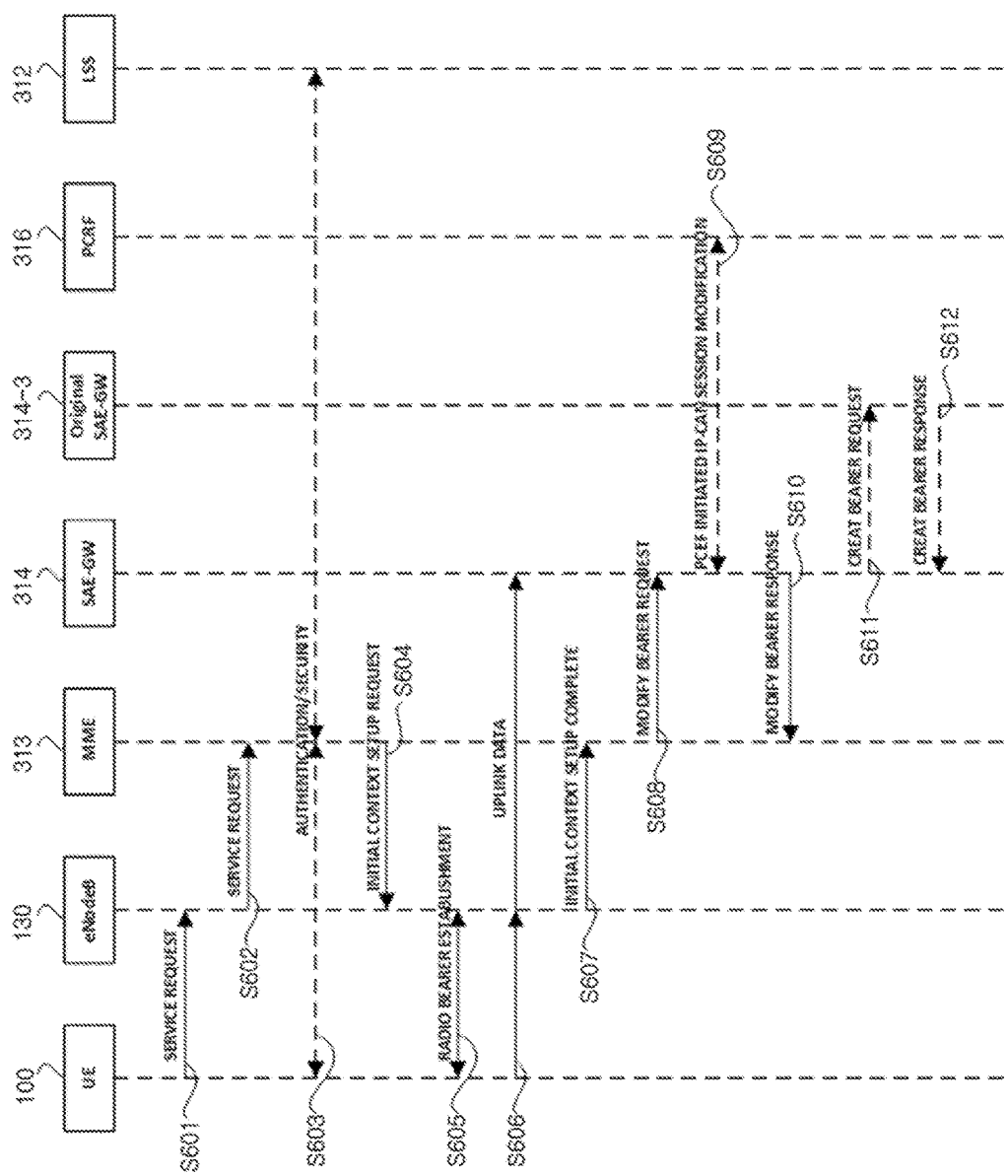
FIG. 6 is a flowchart illustrating a service request procedure by UE according to an exemplary embodiment of the present invention.

FIG. 6 is a flowchart illustrating a service request procedure by UE according to an exemplary embodiment of the present invention.

In step S601, the UE 100 transmits a service request message to the eNodeB 130. For example, when deactivated UE 100 which is in an idle state intends to be activated in order to process new traffic, the UE 100 transmits a NAS service request message to the eNodeB 130 through RRC connection established through the radio link. Herein, the NAS service request message includes an S-TMSI of the UE 100.

In step S602, the eNodeB 130 transfers the received servicer request message to the MME 313. For example, the eNodeB 130 may transmit the service request message through S1 signal connection established between the eNodeB 130 and the MME 313. In this case, the service request message includes information on a serving cell of the UE 100 and the tracking area.

In step S603, the authentication and security procedures are performed among the UE 100, the MME 313, and the LSS 312 in order to examine that the UE 100 is valid.

In step S604, the MME 313 transmits an initial context setup request message to the eNodeB 130. In this case, the initial context setup request message includes information including an address of the SAE-GW 314, a TEID, an EPS bearer, and the like and all S1 bearers are activated.

In step S605, the eNodeB 130 performs a radio bearer establishing procedure with the UE 100 with receiving the initial context setup request message. Through the radio bearer establishing procedure, when a user plane radio bearer is set up, the radio bearer establishing procedure includes a user plane security procedure.

In step S606, the UE 100 transmits uplink data to the SAE-GW 314 through the eNodeB 130. In this case, the eNodeB 130 may transmit to the SAE-GW 314 the uplink data received from the UE 100 based on the address information of the SAE-GW 314 and the TEID information.

In step S607, the eNodeB 130 transmits the initial context setup complete message to the MME 313. For example, in order to confirm an accepted EPS bearer, a rejected EPS bearer, an eNodeB address, and the like to the MME 313, the eNodeB 130 may transmit the initial context setup complete message to the MME 313.

In step S608, the MME 313 transmits a modify bearer request message to the SAE-GW 314 in order to set up a bearer for a downlink data plane facing the eNodeB 130.

In step S609, when a dynamic PCC is placed, the SAE-GW 314 performs a PCEF Initiated IP-CAN Session Modification with the PCRF 316. Therefore, the SAE-GW 314 may acquire a PCC rule depending on an RAT type from the PCRF 316.

In step S610, the SAE-GW 314 transmits a modify bearer response message to the MME 313 as a response to the modify bearer request message. In this case, the modify bearer response message includes the address of the SAE-GW 314 and the TEID for uplink traffic.

In step S611, the SAE-GW 314 transmits a create bearer request message to the original SAE-GW 314-3.

In step S612, the original SAE-GW 314-3 transmits a create bearer response message for the create bearer request message to the SAE-GW 314.

The SAE-GW 314 according to the exemplary embodiment of the present invention may establish a tunnel with the original SAE-GW 314-3 so as to prevent an uplink packet from being transferred to the home network 400 when a destination of uplink data is an address allocated to the disaster area. The tunnel is established through steps S611 and S6112.

Figure 7:
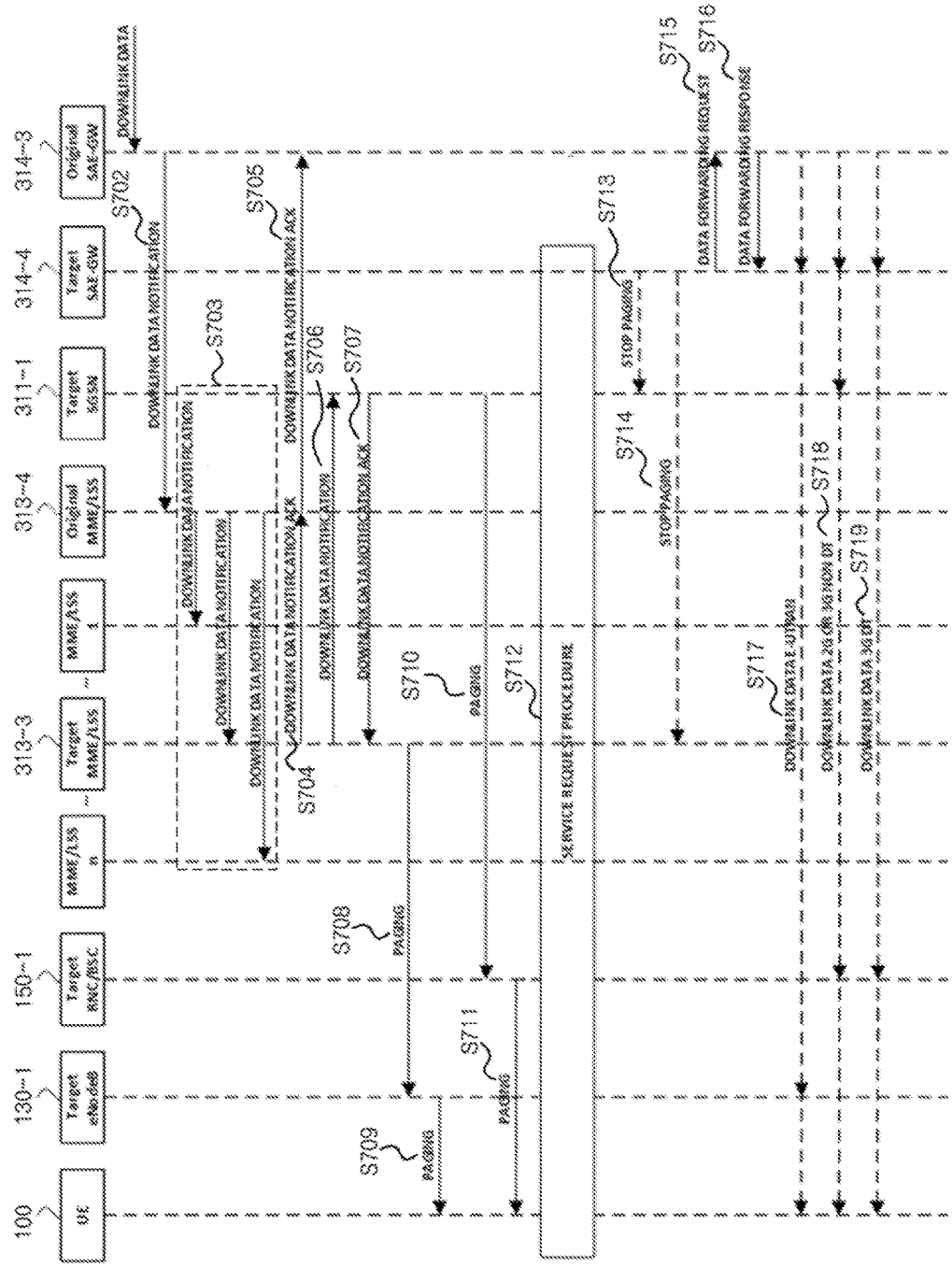
FIG. 7 is a flowchart illustrating a service request procedure by a network according to an exemplary embodiment of the present invention.

FIG. 7 is a flowchart illustrating a service request procedure by a network according to an exemplary embodiment of the present invention. In FIG. 7, the service request procedure triggered by the network using the distributed strategy according to the exemplary embodiment of the present invention will be described.

The position of the UE 100 is notified to the HSS 410 of the home network 400 only once when the UE 100 is initially attached to the mobile EPC 300. The mobile EPC 300 becomes the original mobile EPC. All functional entities of the original mobile EPC may have a name including "original" which is a prefix in order to be distinguished from entities of other mobile EPCs 300.

Since the home network 400 knows only that the UE 100 belongs to the original mobile EPC, if there is a packet to be transmitted to the UE 100, the home network 400 will access the SAE-GW 314 in the early stage.

The mobile EPC 300 served by the UE 100 becomes a target mobile EPC. All functional entities of the target mobile EPC may have a name including "target" which is the prefix in order to be distinguished from the entities of other mobile EPCs 300.

In the distributed strategy according to the exemplary embodiment of the present invention, only a serving mobile EPC has positional information of the UE 100. Therefore, in order to transfer the packet to the UE 100, the original mobile EPC needs to request the positional information of the UE 100 to all other mobile EPCs. Therefore, the distributed strategy may be suitable when the number of mobile EPCs is small.

In step S701, the original SAE-GW 314-3 receives a downlink data packet transmitted from the home network 400 to the UE 100. If the UE context is valid, the service request procedure by the network is similar to a standard procedure that integrates an S-GW and a P-GW. Herein, the case where the UE context is valid means that the target mobile EPC is the original mobile EPC.

In step S702, the original SAE-GW 314-3 transmits a downlink data notification message to the original MME/LSS 313-4 with receiving the downlink data packet. For example, if the UE 100 does not have a context included in the original SAE-GW 314-3, the original SAE-GW 314-3 will buffer downlink data and find an MME/LSS that will serve the UE 100.

In step S703, the original MME 313-4 receives the downlink data notification message and thereafter, transfers the received downlink data notification message to all MMEs in the disaster area. For example, as illustrated in FIG. 7, the downlink data notification message may be transmitted from MME 1 to MME n.

In addition, all MMEs that receive the downlink data notification message may transfer the downlink data notification message received by the SGSN in the same mobile EPC.

In step S704, as the target MME 313-3 which is a serving MME of the UE 100 receives the downlink data notification message, the target MME 313-3 transmits a downlink data notification Ack message to the original MME 313-4 in order to announce that the UE 100 is controllable to the original MME 313-4.

In step S705, as the original MME 313-4 receives the downlink data notification Ack message, the original MME 313-4 transfers the received downlink data notification Ack message to the original SAE-GW 314-3.

In step S706, as the target MME 313-3 receives the downlink data notification message, the target MME 313-3 transfers the received downlink data notification message to the target SGSN 311-1.

In step S707, as the target SGSN 311-1 receives the downlink data notification message, the target SGSN 311-1 transfers the received downlink data notification Ack message to the target MME 313-3.

In step S708, when the target MME 313-3 registers the UE 100, the target MME 313-3 transmits a paging message to the eNodeB 130-1 that belongs to the tracking area registered by the UE 100.

In step S709, as the target eNodeB 130-1 receives the paging message from the target MME 313-3, the target eNodeB 130-1 transmits a paging notification message to each UE 100 in order to find target UE.

In step S710, when the target SGSN 311-1 registers the UE 100, the target SGSN 311-1 transmits the paging message to a target RNC/BSC 150-1.

In step S711, the target RNC/BSC 150-1 pages the UE 100 with receiving the paging message.

In step S712, just the moment when the UE 100 receives a paging indication after being in the idle state, the service request procedure triggered by the UE 100 is initialized as described above in FIG. 6. In this case, the bearer is established between the UE 100 and the target SAE-GW 314-4.

In step S713, the target SAE-GW 314-4 transmits a stop paging message to the target SGSN 311-1 in order to stop a paging procedure after completing the service request procedure.

In step S714, the target SAE-GW 314-4 transmits the stop paging message to the target MME 313-3 in order to stop the paging procedure after completing the service request procedure.

In step S715, the target SAE-GW 314-4 transmits a data forward request message to the original SAE-GW 314-3.

In step S716, the original SAE-GW 314-3 transmits a data forward response message for the data forward request message to the target SAE-GW 314-4.

The target SAE-GW 314-4 performs a procedure of establishing a data plane tunnel to the original SAE-GW 314-3 through steps S715 and S716. Herein, the data plane tunnel is used to forward data between both SAE-GWs.

Consequently, in steps S717 to S719, the downlink data is forwarded from the original SAE-GW 314-3 to the target SAE-GW 314-4 and forwarded to the UE 100 therethrough. Herein, step S717 represents a transmission path of E-UTRAN data, step S718 represents a path in which 2G data or 3G data is transmitted without a direct tunnel between the target SAE-GW 314-4 and the target RNC/BSC 150-1, and step S719 represents the path in which the 3G data is transmitted through the direct tunnel between the target SAE-GW 314-4 and the target RNC/BSC 150-1.

Figure 8:
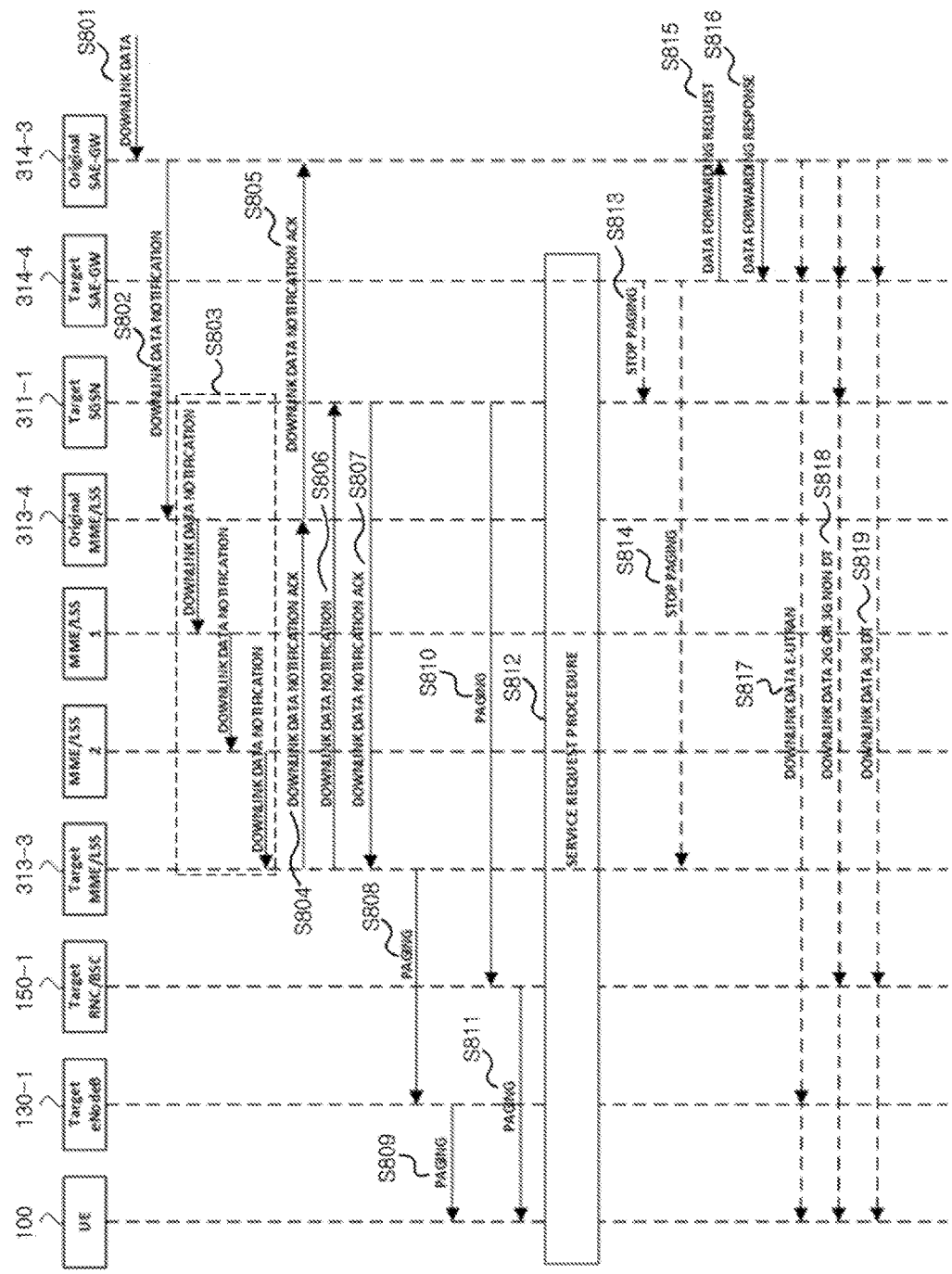
FIG. 8 is a flowchart illustrating a service request procedure by a network according to another exemplary embodiment of the present invention.

FIG. 8 is a flowchart illustrating a service request procedure by a network according to another exemplary embodiment of the present invention. In FIG. 8, the service request procedure triggered by the network using the chain query strategy according to the exemplary embodiment of the present invention will be described. Since names of functional entities illustrated in FIG. 8 are similar to those of FIG. 7, description thereof will be omitted.

In the chain query strategy according to the exemplary embodiment of the present invention, the position of the UE 100 is updated from the new MME/LSS to the old MME/LSS. Therefore, each MME/LSS just knows the MME/LSS after the UE 100 moves. Accordingly, all MMEs/LSSs that register the UE 100 form a chain having the original MME/LSS as a start point.

In order to transfer the packet to the UE 100, until the UE 100 is found, a procedure in which the packet is requested to a link of a chain in which the original mobile EPC is formed, the link requests the packet to the other link, and the other link requests the packet to another link may be repeatedly performed. In order to minimize a delay of the procedure, the length of the chain may be limited to a predetermined maximum value according to determination by the operator. In FIG. 8, the flowchart is described by assuming that the length value of the chain is 3.

Since steps S801 and S802 are the same as steps S701 and S702 of FIG. 7 and steps S804 to S819 the same as steps S704 to S719 of FIG. 7, description thereof will be omitted and hereinafter, a different from FIG. 7 will be primarily described.

In step S803, the original MME 313-4 receives the downlink data notification message from the original SAE-GW 314-3 and thereafter, transfers the received downlink data notification message to MME 1 to which the UE 100 moves from the original MME 313-4. Subsequently, MME 1 transfers the downlink data notification message received from the original MME 313-4 to MME 2 to which the UE 100 moves from MME 1. Subsequently, MME 2's transferring the downlink data notification message received MME 1 is continued to a next link of the chain. Consequently, MME 2 may transmit the downlink data notification message received from MME 1 to the target MME 313-3 to which the UE 100 moves from MME 2.

In addition, all MMEs that receive the downlink data notification message may transfer the downlink data notification message received by the SGSN in the same mobile EPC.

Figure 9:
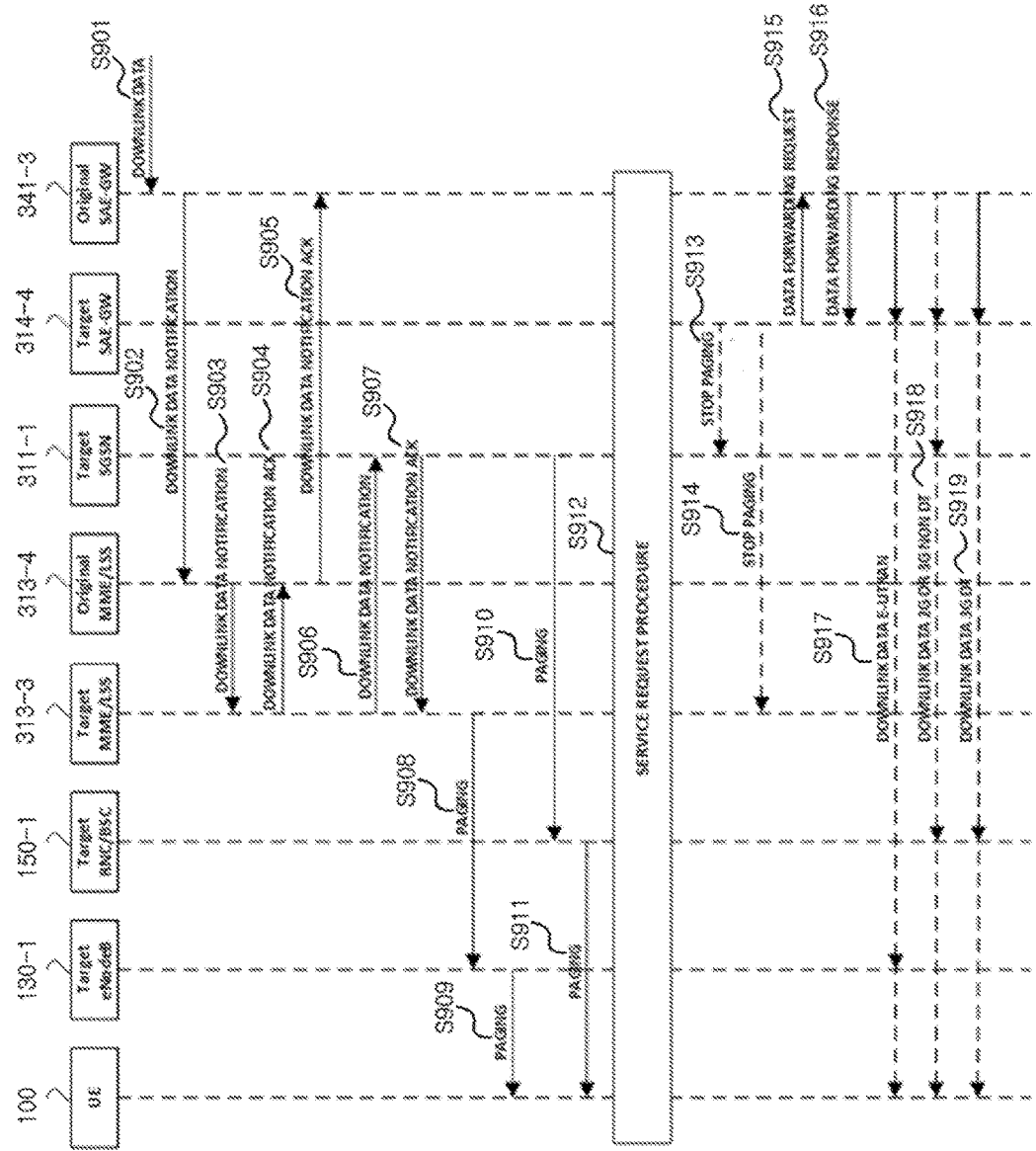
FIG. 9 is a flowchart illustrating a service request procedure by a network according to yet another exemplary embodiment of the present invention.

FIG. 9 is a flowchart illustrating a service request procedure by a network according to yet another exemplary embodiment of the present invention. In FIG. 9, the service request procedure triggered by the network using the centralized strategy according to the exemplary embodiment of the present invention will be described. Since names of functional entities illustrated in FIG. 9 are similar to those of FIG. 7 and/or FIG. 8, description thereof will be omitted.

In the centralized strategy according to the exemplary embodiment of the present invention, whenever the UE 100 deviates from the allocated tracking area or whenever the serving MME is changed, the position of the UE 100 is updated to the original LSS. That is, the original LSS continuously knows the position to which the UE 100 belongs.

Similarly to FIG. 8, since steps S901 and S902 are the same as steps S801 and S802 of FIG. 8 (alternatively, steps S701 and S702) and steps S904 to S919 are the same as steps S804 to S819 (alternatively, steps S701 and S702), description thereof will be omitted and hereinafter, a different from FIGS. 7 and 8 will be primarily described.

In step S903, the original MME 313-4 receives the downlink data notification message from the original SAE-GW 314-3 and thereafter, communicates with the original LSS 313-4 thereof in order to determine the target MME 313-3 served by the target UE and transfers the received downlink data notification message to the determined target MME 313-3.

Figure 10:
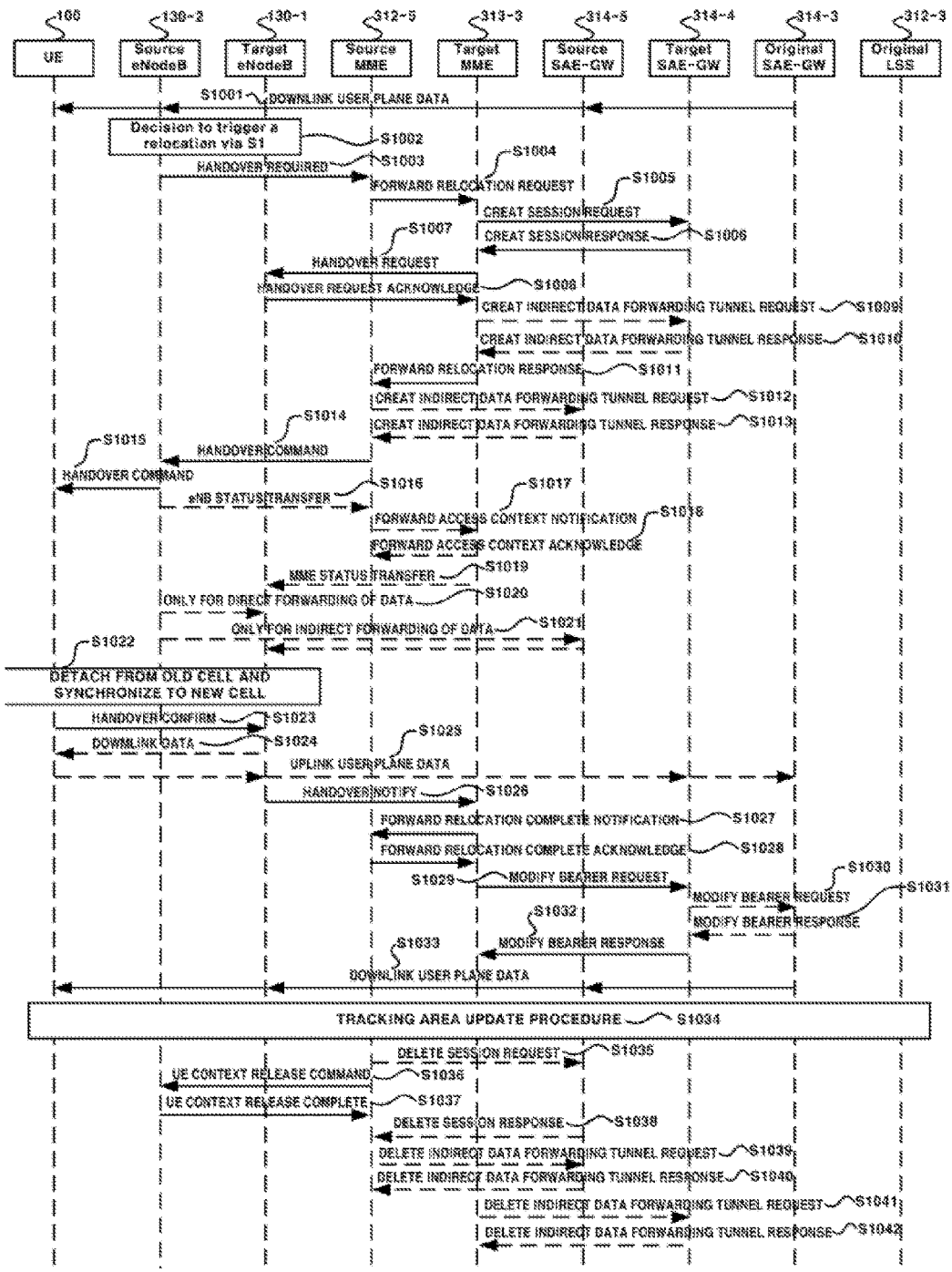
FIG. 10 is a flowchart illustrating a handover procedure by the change of the mobile EPC according to the exemplary embodiment of the present invention.

FIG. 10 is a flowchart illustrating a handover procedure by the change of the mobile EPC according to the exemplary embodiment of the present invention.

In step S1001, downlink data is received through the original SAE-GW 314-3. That is, as described above in FIG. 7, the original SAE-GW 314-3 serves as a mobility anchor of all other SAE-GWs. Therefore, all downlink data received from the home network 400 is transmitted to a serving SAE-GW through the original SAE-GW 314-3.

In step S1002, a source eNodeB 130-2 determines initialization of handover based on an S1 interface to a target eNodeB 130-1 according to a predetermined condition.

In step S1003, the source eNodeB 130-2 transmits a handover required message to a source MME 313-5. The source eNodeB 130-2 represents that a bearer is used for transferring data in the handover required message.

In step S1004, as the source MME 313-5 receives the handover required message from the eNodeB 130-2, the source MME 313-5 selects the target MME 313-3 and transmits a forward relocation request message to the target MME 313-3. Herein, the relocation request message may include a UE context of the source MME 313-5, identification information of the source eNodeB 130-2, and other identification information.

In step S1005, as the target MME 313-3 receives the relocation request message from the source MME 313-5, the target MME 313-3 transmits a create session request message to the target SAE-GW 314-4.

In step S1005, as the target SAE-GW 314-4 receives the create session request message from the target MME 313-3, the target SAE-GW 314-4 transmits a create session response message to the target MME 313-3.

That is, the target MME 313-3 performs a procedure for establishing a new bearer context of the UE 100 in a new SAE-GW through steps S1005 and S1006.

In step S1007, as the target MME 313-3 receives the create session response message from the target SAE-GW 314-4, the target MME 313-3 transmits a handover request message to the target eNodeB 130-1. The handover request message allows the target eNodeB 130-1 including information of the bearer and a security context to create the UE context.

In step S1008, the target eNodeB 130-1 transmits a handover request acknowledge message to the target MME 313-3 in order to announce an EPS bearer setup list to the target MME 313-3.

When indirect transferring is applied, a parameter is set up for the purpose of transferring the packet from the source eNodeB 130-2 to the target eNodeB 130-1 through an indirect path in steps S1009, S1012, and S1013.

In step S1011, the target MME 313-3 transmits a forward relocation response message to the source MME 313-5. Herein, the forward relocation response message may include an EPS bearer setup list, addresses, TEID, and the like.

In step S1014, the source MME 313-5 transmits a handover command message to the source eNodeB 130-2. Herein, the handover command message may include a bearer list to be released, an address list, and a TEID allocated for forwarding.

In step S1015, as the source eNodeB 130-2 receives the handover command message from the source MME 313-5, the source eNodeB 130-2 transfers the handover command message to the UE 100. In this case, the UE 100 removes the corresponding EPS bearer from the list just after receiving the handover command message.

In step S1016, the source eNodeB 130-2 transmits an eNodeB Status Transfer message to the target eNodeB 130-1 through the MMEs in order to transfer PDCP and HFN states of an E-RAB.

In step S1017, the source MME 313-5 transmits a forward access context notification message to the target MME 313-3. Herein, the forward access context notification message includes PDCP and HFN state information of the E-RAB.

In step S1018, as the target MME 313-3 receives forward access context notification message, the target MME 313-3 transmits a forward access context acknowledgement message to the source MME 313-5.

In step S1019, the target MME 313-3 transmits an MME status transfer message to the target eNodeB 130-1.

In step S1020 or S1021, the source eNodeB 130-2 starts transferring of the downlink data to the target eNodeB 130-1 from the source eNodeB 130-2. Step S1020 represents the direct path and step S1021 represents the indirect path.

In step S1022, simultaneously, the UE 100 performs detaching from an old cell and performs synchronization with a new cell.

In step S1023, as the UE 100 succeeds in synchronization with the new cell, the UE 100 transmits a handover confirm message to the source eNodeB 130-1.

In step S1024, a downlink packet transferred from the source eNodeB 130-2 is transmitted to the UE 100 through the target eNodeB 130-1.

In step S1025, an uplink packet transmitted by the UE 100 is transmitted to the outside through the original SAE-GW 314-3.

In step S1026, the target eNodeB 130-1 transmits a handover notify message to the target MME 313-3 when any error also does not occur.

In step S1027, the target MME 313-3 transmits a forward relocation complete notification message to the source MME 313-5.

In step S1028, as the source MME 313-5 receives a forward relocation complete acknowledgement message, the source MME 313-5 transmits a forward access context acknowledgement message to the target MME 313-3.

That is, in steps S1027 and S1028, the target MME 313-3 and the source MME 313-5 cooperate with each other in order to announce and answer the change of the MME. Meanwhile, a timer of the source MME 313-5 starts. When the timer expires, all resources in the source SAE-GW 314-5 need to be released. When the indirect transferring is applied, the timer starts in the target MME 313-3 after step S1028 for the purpose of releasing an indirect data transfer path.

In step S1029, the target MME 313-3 transmits a modify bearer request message to the target SAE-GW 314-4 for each PDN connection including connection which needs to be released.

In step S1030, the target SAE-GW 314-4 transmits the modify bearer request message to the original SAE-GW 314-3. Herein, the modify bearer request message may include information of an allocated address and the TEID.

In step S1031, the original SAE-GW 314-3 updates a context field thereof and thereafter, transmits a modify bearer response message including the information of the UE 100 to the target SAE-GW 314-4.

In step S1032, the target SAE-GW 314-4 transmits a modify bearer response message to the target MME 313-3 as a response to the modify bearer request message after modification.

In step S1033, the original SAE-GW 314-3 starts transmission of the downlink packet to the target SAE-GW 314-4 by using the received address and TEID. In this case, a condition for updating the tracking area of the UE 100 is satisfied. In this case, the UE 100 moves to another mobile EPC.

In step S1034, the UE 100 initializes the tracking area update procedure.

In step S1035, the source MME 313-5 transmits a delete session request message to the source SAE-GW 314-5 in order to request deletion of all EPS bearers associated with the UE 100 to the SAME-GW 314-5.

In step S1036, when the timer which starts in step S1027, the source MME 313-5 transmits a UE context release command message to the source eNodeB 130-2 in order to request release of the resource associated with the UE 100 to eNodeB 130-2.

In step S1037, the source eNodeB 130-2 transmits a UE context release complete message to the source MME 313-5 as a request of the source MME 313-5 is completed.

In step S1038, the source SAE-GW 314-5 transmits a delete session response message to the source MME 313-5 as a request of the source MME 313-5 is completed.

In steps S1039 to S1042, when the indirect transferring is applied, after timers of the source MME 313-5 and the target MME 313-3 expired, the source MME 313-5 and the target MME 313-3 communicate with the source SAE-GW 314-5 and the target SAE-GW 314-4, respectively in order to remove all used tunnels or for the purpose of the indirect transferring.

Meanwhile the components of the exemplary embodiment may be easily determined from a process viewpoint. That is, the respective components may be determined as the respective processes. Further, the process of the exemplary embodiment may be easily determined from the viewpoint of the component of the apparatus.

Further, the technical contents may be implemented in a program command form executable by various computer means and recorded in a computer readable medium. The computer readable medium may include one or a combination of a program command, a data file, and a data structure. The program command recorded in the medium may be specially designed and configured for the exemplary embodiments, or may be publicly known to and used by those skilled in the computer software field. Examples of the computer-readable recording medium include magnetic media such as a hard disk, a floppy disk, and a magnetic tape, optical media such as a CD-ROM and a DVD, a magneto-optical media such as a floptical disk, and a hardware device which is specifically configured to store and examples of the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the exemplary embodiment, and an opposite situation thereof is available.

The exemplary embodiments of the present invention areillustrative only, and various modifications, changes, substitutions, and additions may be made without departing from the technical spirit and scope of the appended claims by those skilled in the art, and it will be appreciated that the modifications and changes are included in the present invention.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A paging method performed in a plurality of mobile evolve packet cores (EPCs) moving to a disaster area and forming a public safety network (PSN), the paging method comprising:

transmitting, by an original system architecture evolution gateway (SAE-GW) included in an original mobile EPC among the plurality of mobile EPCs, a downlink data notification message to an original mobility management entity (MME) in the original mobile EPC with receiving downlink data transmitted to a mobile user equipment (UE) that is connected to the original mobile EPC, wherein positional information of the mobile UE is notified to a home subscriber server (HSS) when the mobile UE is initially connected to the original mobile EPC;

transferring, by the original MME, the downlink data notification message to MMEs of the plurality of mobile EPCs excluding the original mobile EPC;

transmitting, by a target MME which is included in a serving mobile EPC of the mobile UE among the plurality of mobile EPCs, a downlink data notification Ack message to the original MME in order to announce that the mobile UE is controllable to the original MME with receiving the downlink data notification message;

transmitting, by the original MME, the downlink data notification acknowledgment (Ack) message received by the original MME to the original SAE-GW;

transferring, by the target MME, the received downlink data notification message to a target serving support node included the serving mobile EPC;

transmitting, by the target serving support node, the received downlink data notification Ack message to the target MME;

transmitting, by the target MME, a paging message to a target base station which belongs to a tracking area (TA) in which the mobile UE is registered; and performing, by the plurality of mobile EPCs, paging according to a distributed strategy, wherein current positional information of the mobile UE is possessed only by the serving mobile EPC, wherein the performing of the paging according to the distributed strategy comprises:

requesting, by the original mobile EPC, that the current positional information of the mobile UE be transmitted to remaining mobile EPCs; and requesting, by the original MME, that the current positional information of the mobile UE be transmitted to MMEs of the remaining mobile EPCs.

* * * * *